US005974397A

United States Patent [19]

Olsson et al.

[11] Patent Number: 5,974,397

[45] Date of Patent: Oct. 26, 1999

[54] METHOD AND DEVICE FOR RADIO COMMUNICATION BETWEEN MUTUALLY MOVABLE OBJECTS

[75] Inventors: Lars Olsson, Jönköping; Anders Hjelmare, Gränna, both of Sweden

[73] Assignee: Combitech Traffic Systems AB, Jönköping, Sweden

[21] Appl. No.: 08/817,487

[22] PCT Filed: Oct. 6, 1995

[86] PCT No.: PCT/SE95/01153

§ 371 Date: Jul. 17, 1997

§ 102(e) Date: Jul. 17, 1997

[87] PCT Pub. No.: WO96/11452

PCT Pub. Date: Apr. 18, 1996

[30] Foreign Application Priority Data

Oct. 11, 1994 [SE] Sweden .................................. 9403480

[51] Int. Cl.[6] ...................................................... G06F 17/60

[52] U.S. Cl. ............................ 705/13; 340/928; 340/933; 340/937; 235/384

[58] Field of Search .............................. 705/13; 340/933, 340/937, 928; 235/384

[56] References Cited

U.S. PATENT DOCUMENTS

| | | | |
|---|---|---|---|
| 4,303,904 | 12/1981 | Chasek . | |
| 5,144,553 | 9/1992 | Hassett et al. . | |
| 5,310,999 | 5/1994 | Claus et al. | 235/384 |
| 5,428,353 | 6/1995 | Bird | 340/933 |
| 5,554,984 | 9/1996 | Shigenaga et al. | 340/937 |

FOREIGN PATENT DOCUMENTS

| | | |
|---|---|---|
| 0 425 961 | 5/1991 | European Pat. Off. . |
| 0 577 328 | 1/1994 | European Pat. Off. . |
| 0 616 302 | 9/1994 | European Pat. Off. . |
| 2 248 957 | 4/1992 | United Kingdom . |
| 92 08210 | 5/1992 | WIPO . |

*Primary Examiner*—Allen R. MacDonald
*Assistant Examiner*—M. Irshadullah
*Attorney, Agent, or Firm*—Pollock, Vande Sande & Amernick

[57] ABSTRACT

A method for radio communication between mutually mobile objects. Prior to radio communication between the objects, calculations are preformed with a communication and calculation unit of a first of the objects to produce established data, answer codes are generated from the established data, and one of the answer codes is selected for communication to a second of the objects. The communication between the objects is carried out, including transmission of the selected answer code from the first object to the second object and transmission of data from the second object to the first object. After radio communication between the objects, calculations are performed with the communication and calculation unit of the first of the objects. A final result of the communication of between the objects and calculations performed by the communication and calculation unit of the first of the objects is stored after radio communication between the objects. Outside communication with the communication and calculation unit is prevented after communication between the objects, during the performance of calculations by the communication and calculation unit of the first of the objects and storage of the final result.

16 Claims, 2 Drawing Sheets

METHOD AND DEVICE FOR RADIO COMMUNICATION BETWEEN MUTUALLY MOVABLE OBJECTS

FIELD OF THE INVENTION

The present invention relates to a method and a device for radio communication between mutually mobile objects. The present invention is especially intended for communication between a fixed object, which can be a road toll facility, and a mobile object, which can be a vehicle passing the toll facility. The present invention is capable of communicating wirelessly with the road toll facility for performing an operation.

BACKGROUND OF THE INVENTION

U.S. Pat. No. 4,303,904, to Chasek, for example, discloses a system for a road toll facility where radio communication with a vehicle is used to perform an identification and payment operation. The operation should be completed even if the vehicle passes at high speed. To obtain a sufficiently selective communication even if several vehicles pass the road toll facility simultaneously, shortwave radiowaves, such as microwaves, with extremely limited range are used. This means that the operation must be performed while the vehicle passes a relatively short distance which gives a very short available time for the operation if the vehicle travels at high speed.

If the operation comprises several steps, which often must be the case, it is a problem to perform the whole operation in the short time available. To solve this problem, it has been suggested in, for example, U.S. Pat. No. 5,144,553, to Hassel, to divide the communication cycle among several units in the road toll facility. According to Hassel, a first part of the operation can be performed in a first unit in the traveling direction of the vehicle. The operation must be continued by a second unit and concluded by a third unit.

Such an arrangement will naturally be more expensive than an arrangement in which only one communication unit is required. This additionally results in an extended facility along the passage, which is not desirable. For each communication unit, the equipment usually requires a gantry mounted above the road. Several such gantries, one after the other, will be less aesthetically appealing and result in higher installation and maintenance costs.

SUMMARY OF THE INVENTION

The present invention provides a method by which the time required for the above-described operation is reduced, so that an operation in several steps can be performed by a single communication unit at the highest possible vehicle speed in road traffic. The invention also provides a device for carrying out the method.

The present invention addresses the disadvantages of dividing the operation among several communication units and the associated equipment usually required if high vehicle is permitted in passing a toll facility.

BRIEF DESCRIPTION OF THE DRAWINGS

The following description depicts an embodiment of the invention, which is illustrated on the accompanying drawings, in which.

DETAILED DESCRIPTION OF THE INVENTION

Figure 1:
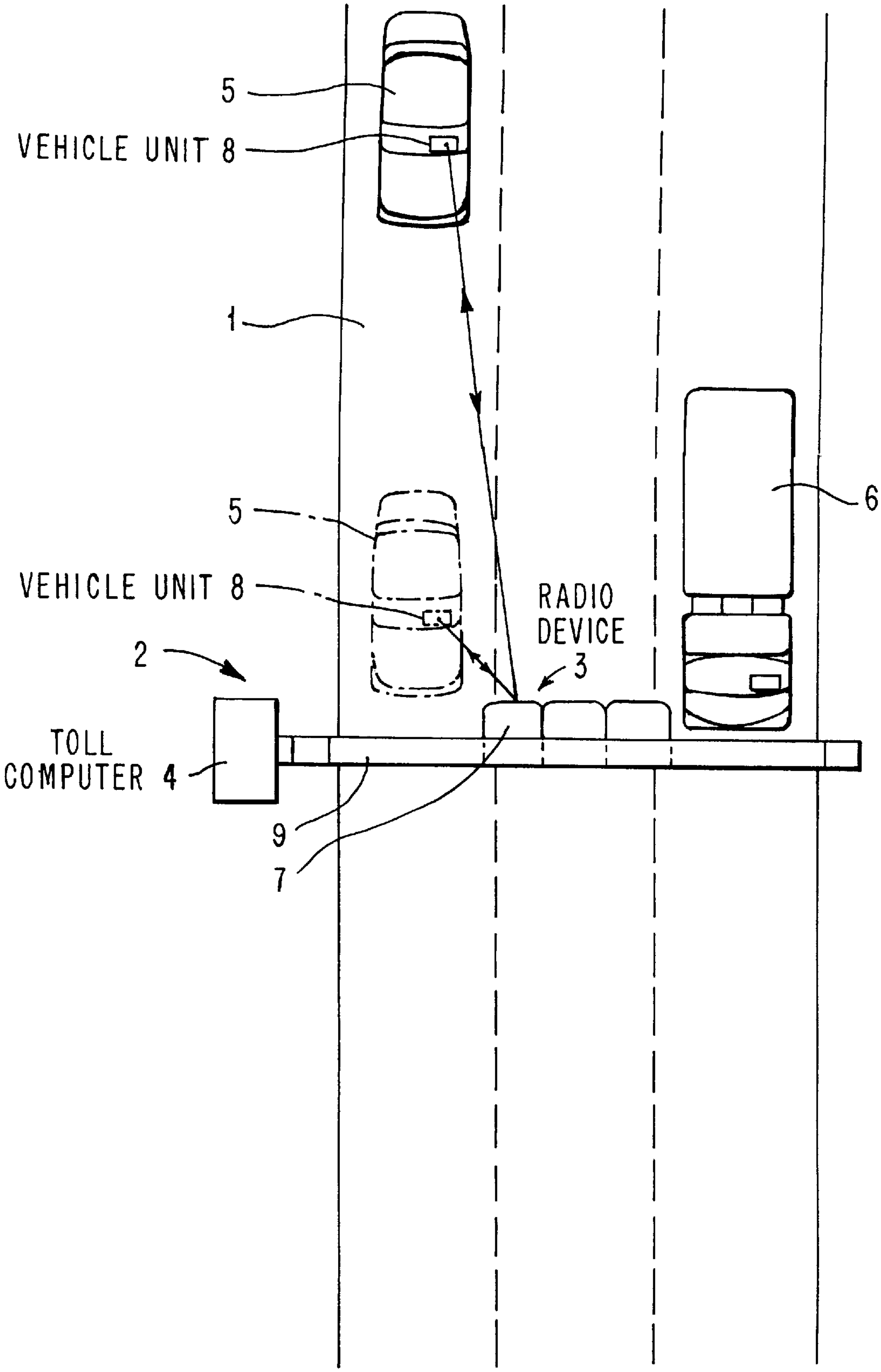
FIG. 1 represents an overview of an embodiment of a road toll facility according to the present invention with passing vehicles.

The road toll facility shown in FIG. 1 is located by a road 1, marked to have three lanes in which the passing vehicles can travel in free formation. Above the road 1 extends a gantry 2, which carries a transmitter and receiver equipment 3 for radiowaves. The device 3 stands in wired connection with a computer 4 belonging to the road toll facility.

A vehicle approaching the road toll facility is designated by 5. This is also shown with dashed/dotted lines in a second position in which it is closer to the radio device 3 on the gantry 2. It is understood here that it shall be possible to perform an identification and payment operation while the vehicle passes between the two designated positions. FIG. 1 also illustrates a vehicle 6 that has passed the positions and for which the operation, therefore, shall have been concluded.

The operation is performed by a wireless connection between the transmitter and receiver unit 3 of the road toll facility via an antenna unit designated 7 and a vehicle unit, designated 8, in the vehicle 5. Communication equipment for such a purpose is described, for example, in U.S. Pat. No. 3,914,762, to Klensch, in which microwaves are used. In this system, the fixed transmitter and receiver equipment 3 are active, and the vehicle unit 8 is passive, in that it receives the radio signal and reflects it modulated so that it transmits a coded message.

Figure 2:
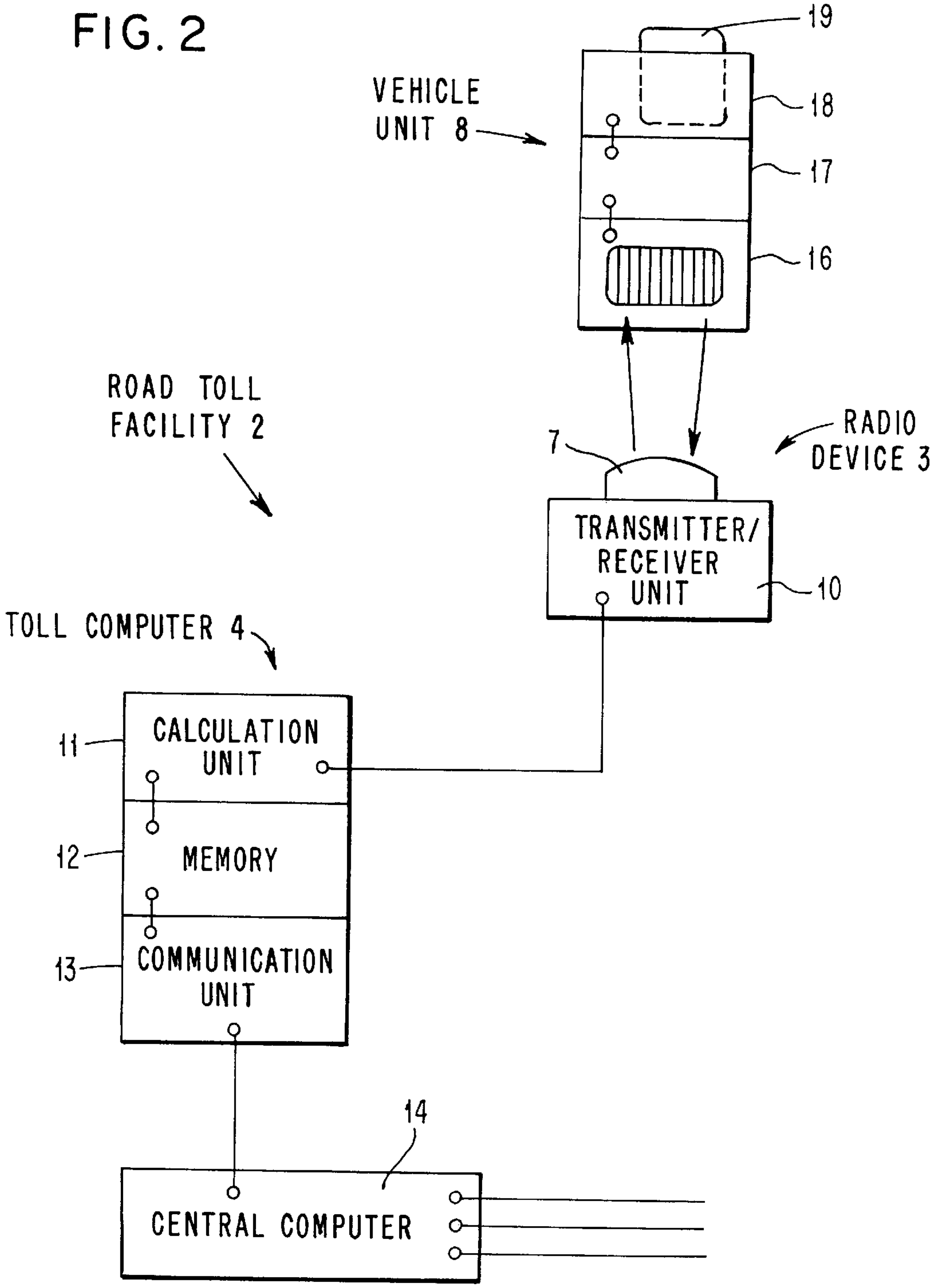
FIG. 2 represents a block diagram of units included in a device according to the present invention.

The above-described communication equipment is shown in the form of a block diagram in FIG. 2. The fixed equipment belonging to the road toll facility gantry 2 is indicated by 22. The vehicle unit is designated 8, as in FIG. 1. The equipment of the road toll facility comprises the above-described transmitter and receiver equipment whose electronic part in FIG. 2 is designated by 10. This is connected to the antenna 7 and to the computer 4 of the road toll facility. The computer comprises a calculation unit 11, a memory 12, and a unit 13 for communication with a central computer 14, which is understood to be connected to several road toll facilities.

The vehicle unit 8 consists of the passive transmitter and receiver unit 16, which is referred to herein as the transponder. The transponder 16 is connected to a vehicle computer 17 with calculation and data storage capacity. The computer is, in turn, connected to a card reader 18 for a smart card 19. The smart card is a card with stored data that can be read in the card reader 18. The data also be replaced by modified data.

The purpose of the operation performed through communication between the road toll facility equipment and the vehicle unit, is payment of a toll fee including transmission of data corresponding to the toll fee of the toll facility and the vehicle in question from the vehicle unit to the road toll facility equipment. These data have here the form of "electronic money". That is, the data are stored on the smart card 19 in connection with a corresponding payment from or account debiting the account of the one who will pay the toll fee. When passing the toll facility with the described equipment and with the card 19 inserted in the vehicle unit, the data stored on the card can be used as required through the reprogramming of the card memory by deducting the toll debitings registered in the vehicle unit.

The toll debitings are stored in connection with the respective payment operations in the memory 12 of the toll computer 4 for successive transmission to the central computer 14. Thereby, the debitings for the toll facility passages of the vehicles can be cleared between the interacting parties. The interacting parties include the institution, which on instructions from the one who shall bear the cost for the toll fees programs data into the respective card 19 and, thereby receives the data. The interacting parties also include the one who eventually shall receive payment of the toll fees. At the same time, statistics can be obtained from the system. The statistics can relate, for example, to the distribution of toll passages on different road toll facilities in a certain area and to the type of passing vehicles.

In a system such as the one described above, with a prepaid balance registered in a smart card memory, mainly the following operational steps shall be performed:

1. The entrance of a vehicle within the range of action of the toll equipment is registered. This takes place through periodic transmission of signals by the toll facility transmitting equipment and modulation and retransmission of the signals by a vehicle transponder, thereby indicating that a vehicle has come into the toll facility. However, the registration can alternatively be performed with other means, such as radar or ultrasound.
2. The toll facility transmitter transmits an identification code that is specific for the toll facility.
3. The vehicle unit transmits an identification code regarding the vehicle. This code identifies the vehicle type according to a classification that is pertinent for the toll fees. These fees are usually different for different vehicle classes, such as motor bikes, passenger cars, buses and trucks.

The code can also contain an identification of the vehicle such as its license number. In the system with prepaid balances, this is usually not considered necessary, and, on the contrary, is considered an unnecessary intrusion on privacy.
4. In the toll facility computer, the relevant toll amount is calculated based on current fee rates and the information on class obtained from the vehicle.
5. The toll facility transmitter transmits a code designating the calculated amount.
6. The vehicle unit receives information regarding the amount that is to be paid.
7. The vehicle unit computer calculates the remaining balance programmed into the smart card.
8. The vehicle unit informs the toll facility of the balance.
9. The toll facility receives information on the balance.
10. The toll facility computer compares the balance with the calculated toll fee. If the balance is at least as great as the toll fee, a code is generated designating the debiting. Alternatively, if the balance is not sufficient, a code is activated that the vehicle shall be captured for post-debiting. This can take place in various ways, such as by stopping the vehicle with a road barrier, which is only lifted if a code for free passage is activated, or in a system for free traffic flow through video registration of the license plate number of the vehicle.
11. The code generated by the toll facility is transmitted to the vehicle unit, resulting in either a message for free passage and order of debiting or a message that payment must be performed in manner other than via the wireless communication.
12. In the case of a message for free passage, the indicated toll fee is deducted in the vehicle unit from the balance on the card
13. The vehicle unit transmits a code to the toll facility indicating that the toll fee has been drawn from the balance.

Usually, the described communication takes place in coded form, for example through the use of algorithms, in order to obtain higher security against manipulation.

The above provides an example of the operational steps that are required. In practice, the operation is also sometimes performed in another order and including the same or other steps. Such variations, however, do not constitute any important deviations from the described procedure.

All these operational steps must be performed in the time that the vehicle remains within the range of action of the toll facility, that is, the area in which the toll facility transmitter and receiver equipment can communicate with the vehicle transponder. This area is dependent on the range of the used radiowaves. It is therefore a requirement that communication with several vehicles within the range of action shall take place selectively.

In toll facilities with free flow, one must anticipate high vehicle speeds. High speeds in conjunction with the desire to carry out the operation within communication distance of the toll facility means that the operation must be performed in a time of 100 milliseconds if it is not desired to separate the toll facility communication equipment in several units along the road. In practice, great problems arise here to find time for all the steps of communication and calculation in the period of time. According to the solution of the present invention, these problems are overcome by carrying out the operational steps in a way other than that described above. The steps are partly performed outside the period of time in which it is certain that the vehicle remains in the range of action of the toll facility.

The solution according to the present invention is based on the following important solutions:

A. The computer of the vehicle unit has a storage space such that the prepared answer codes can be programmed. Each answer code contains information on vehicle class, which is unchangeable information, and current balance, which is a changeable piece of information. The balance is not checked during the operation. Rather, the computer itself independently updates the balance without being activated by the transmitter equipment in a toll facility. Such an answer code established before the communication is selected by the computer to correspond to information on the vehicle class together with current balance and information on the method of coding, for example current algorithm.

Corresponding answer codes must be programmed in the toll facility computer, so that starting out from the answer code transmitted by the vehicle, the corresponding balance can be compared with the toll fee for the vehicle class that is also evident from the answer code transmitted by the vehicle.

B. The vehicle computer is arranged such that during operation it does not reduce the balance on the card, but only stores in the memory data for such deduction of the toll fee from the card balance. As a result of carrying out this operational step after the vehicle has passed the toll facility, that is, outside of the time interval, rather than displaying the conventional answer from the vehicle computer of "Informed amount drawn from the card balance," the computer will display the message "Informed amount will be drawn from the card balance." To ensure that a reduction of the smart card balance will in fact be carried out, the vehicle unit is also arranged such that after display of the message, the vehicle unit will be unaffected by any outside change until conclusion of the operational. The smart card is thereby electronically locked from change of data and is not usable if removed too soon, before the balance has been reduced.

The operational steps according to the present invention will then be:

1. The toll facility equipment is activated by the entrance of a vehicle into its range of action.
2. The toll facility transmits its identification code to the vehicle unit.
3. The vehicle unit transmits the prepared, pertinent answer code, giving vehicle class and information regarding balance.
4. The toll facility computer activates the toll fee that corresponds to the vehicle class according to the received code, and establishes that it lies within the balance evident from the message of the vehicle unit.
5. The toll facility transmitter equipment transmits a code giving the fee that shall be drawn and that the balance holds the amount of the fee.
6. The vehicle unit answers that the amount is registered for deduction from the card.
7. The toll facility transmits an acknowledgment code to the vehicle unit and possibly to devices for passage checks, stating that free passage is obtained.

If the balance is not sufficient or if the vehicle for some other reason cannot be given free passage, a stopping or registration procedure starts as described stated above.

The basic principle of the invention is then, that certain parts of the computer processing required in connection with a payment operation, are performed outside of the period of communication, so that the time required for calculation and registration does not prolong the period required for communication. This principle may be applicable also in operations other than the one described for debiting of toll fees. However, the invention should have its most important application here.

We claim:

1. A method for radio communication between mutually mobile objects, the method comprising:

prior to radio communication between the objects performing calculations with a communication and calculation unit of a first of the objects to produce established data, generating answer codes from the established data, and selecting one of the answer codes for communication to a second of the objects;

carrying out the communication between the objects including transmission of the selected answer code from the first object to the second object and transmission of data from the second object to the first object;

after radio communication between the objects performing calculations with the communication and calculation unit of the first of the objects;

storing a final result of the communication of between the objects and calculations performed by the communication and calculation unit of the first of the objects after radio communication between the objects; and preventing outside communication with the communication and calculation unit of the first of the objects after communication between the objects, during the performance of calculations by the communication and calculation unit of the first of the objects and storage of the final result.

2. The method according to claim 1, wherein the objects include vehicles passing a road toll facility, and wherein the communication is carried out as the vehicles pass the toll facility and are within radio communication range.

3. The method according to claim 2, wherein the method comprises performing a payment operation between the vehicles and the road toll facility, the method further comprising:

storing a balance from which fees paid in the toll facility can be deducted and to which additional funds can be added on a separable storage medium of the communication and calculation unit of a vehicle;

storing the answer codes comprising a payment class assigned to the vehicle and the balance on the vehicle communication and calculation unit;

communicating the answer codes to a toll facility communication and calculation unit;

decoding the answer codes in the toll facility communication and calculation unit to determine the vehicle class, current balance, toll for the vehicle, and whether the balance is sufficient to cover the toll;

communicating to the vehicle with the toll facility communication and calculation unit the toll amount; and storing the toll amount in the vehicle communication and calculation unit for later deduction from the balance.

4. The method according to claim 3, wherein the toll is deducted from the balance after passage of the vehicle out of communication range from the toll facility.

5. The method according to claim 3, wherein the toll is deducted from the balance after completion of the communication between the vehicle and the toll facility.

6. The method according to claim 3, wherein after communication of the toll to the vehicle communication and calculation unit, outside communication with the vehicle communication and calculation unit is prevented until deduction of the toll from the balance.

7. The method according to claim 3, wherein the answer codes are stored in the toll facility communication and calculation unit.

8. The method according to claim 3, wherein the separable storage medium is a smart card.

9. The method according to claim 3, wherein prior to communication between the vehicle and the toll facility the balance and the answer codes are stored in the separable storage medium and an appropriate answer code is selected corresponding to a current balance.

10. The method according to claim 3, wherein during communication between the vehicle and the toll facility:

the toll facility communication and calculation unit transmits to the vehicle a code identifying the toll facility;

the vehicle communication and calculation unit transmits one of the answer codes to the toll facility communication and calculation unit after receiving the toll facility identifying code;

the toll facility communication and calculation unit transmits data designating the toll fee after receiving the answer code; and the vehicle communication and calculation unit after receiving the data designating the toll fee transmits data constituting confirmation that the toll fee is to be deducted from the balance on the storage medium.

11. The method according to claim 3, wherein after communication between the vehicle and the toll facility:

the toll fee is deducted from the balance on the storage medium based on data heretofore stored temporarily in the vehicle communication and calculation unit.

12. The method according to claim 1, further comprising:

performing calculations with a communication and calculation unit of the second object based upon the selected answer code.

13. A device for carrying out radio communication between mutually mobile objects, comprising:

a communication and calculation unit on each object, the communication and calculation unit comprising wireless communication equipment for communicating between the objects and computer equipment for performing a multi-step calculation and data storage operation; and a data storage medium on a first of the objects, the storage medium comprising changeable contents comprising a balance and answer codes, the answer codes representing the balance; and wherein the calculation and data storage operation comprises selection of an answer code by the first object communication and calculation unit, transmitting the selected answer code from the first object to a second object, storage of the selected answer code by the second object, and storage by the first object of an amount to be deducted from the balance, the first unit further comprises a lock for preventing communication with the communication and calculation unit of the second object after communication between the objects.

14. The device according to claim 13, wherein the data storage medium is a smart card.

15. The device according to claim 13, wherein:

one of the objects is a road toll facility and the other objects are vehicles;

the radio communication between the objects comprises collecting a toll fee;

the answer codes further comprise data representing a class of the vehicle;

the vehicle communication and calculation unit temporary stores an amount of data corresponding to the toll fee and after conclusion of the communication the vehicle communication and calculation unit transfers the amount of data corresponding to the toll fee to the storage medium for deduction from the balance; and during the time between the temporary storage and the deduction the temporary storage and the storage medium are locked against external influence until the deduction has been carried out.

16. The device according to claim 15, wherein the vehicle communication and calculation unit comprises a transponder and the toll facility communication and calculation unit comprises microwave transmitter and receiver equipment and wherein the storage medium comprises a smart card.

* * * * *